F. A. DAILEY.
PLASTIC PACKING.
APPLICATION FILED AUG. 4, 1910.
1,056,010.
Patented Mar. 18, 1913.
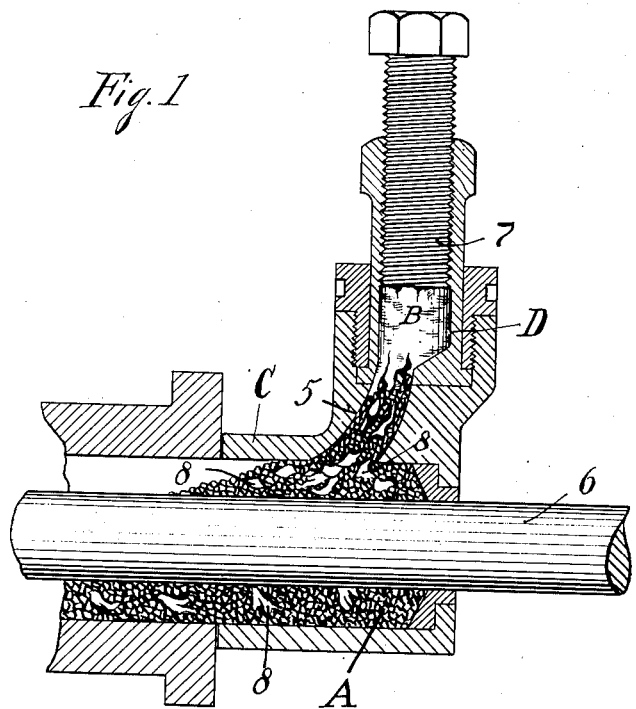
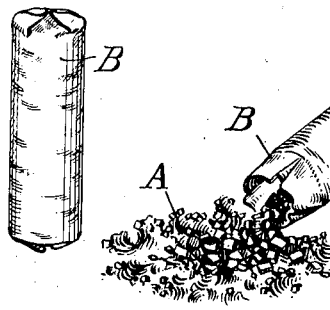
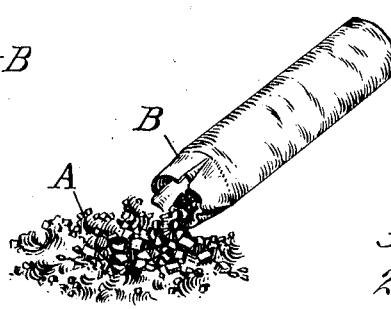
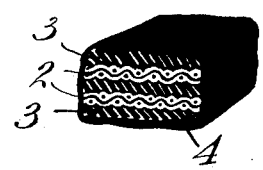
Witnesses,
George Voelker
H. Smith
Inventor,
Fred A. Dailey
by Lothrop & Johnson
his Attorneys.

UNITED STATES PATENT OFFICE.

FRED A. DAILEY, OF ST. PAUL, MINNESOTA.

PLASTIC PACKING.

1,056,010.  Specification of Letters Patent.  Patented Mar. 18, 1913.

Application filed August 4, 1910. Serial No. 575,432.

*To all whom it may concern:*

Be it known that I, FRED A. DAILEY, a citizen of the United States, residing at St. Paul, in the county of Ramsey and State of Minnesota, have invented certain new and useful Improvements in Plastic Packing, of which the following is a specification.

My invention relates to improvements in plastic packing for piston rods, throttle rods, valve stems, pump rods and the like, being particularly designed for use with stuffing boxes adapted to hold a reserve supply of packing, such as that shown in Letters Patent No. 934,289 issued to me jointly with Barney Long on September 14, 1909.

The object of the invention is to provide a resilient, steam resisting packing which will have a "flow," as it were, and can be fed under pressure to and around the rod, and which will be easy to make and handle.

With these and other objects in view the invention consists in the construction, combination and arrangement of parts hereinafter described and claimed.

In the accompanying drawings forming part of this specification, Figure 1 is a longitudinal section through a throttle rod stuffing box supplied with the improved packing; Fig. 2 is a perspective view of a tube of the packing ready for insertion into the stuffing box; Fig. 3 is a perspective view of the tube in another position with one end open and some of the packing discharging therefrom; and Fig. 4 is a perspective view upon a very much enlarged scale of a section of one of the individual pieces or particles of the packing.

The base of the packing consists of little laminated pieces or particles, such as that shown in Fig. 4, consisting of alternate layers of woven or other fabric 2, and sheet rubber 3. These particles are preferably about a quarter of an inch long and wide, and are not usually or necessarily of any definite or regular shape. They are most conveniently made by taking ordinary sheet packing, or rubber steam hose, which is made up of alternate layers of fabric (such as cotton duck) and rubber, and cutting it up into little particles of the desired size. These particles are then mixed with a sufficient quantity of prepared graphite flakes and lubricating oil completely to cover and coat the particles and to make a sticky mass such as the mass A shown discharging from the tube in Fig. 3. The coating of graphite and oil is indicated at 4 in Fig. 4. The plastic packing thus prepared is then packed under pressure in ready formed tubes or cases B of paper, tin foil or other soft, flexible and frangible material, which will work in with the packing and not interfere with its flow, and the ends of the tubes sealed.

In Fig. 1 of the drawings the packing is shown in use in a throttle rod stuffing box C such as that disclosed in Letters Patent No. 934,289 referred to above. This stuffing box has an open bottomed storage chamber D from which the packing passes down through a passage 5 to the interior of the stuffing box and about the throttle rod 6, which works therein. In the storage chamber is a screw ram 7 which can be screwed down upon the packing as desired to force it into the stuffing box.

In use, a tube or case of the prepared packing is inserted into the storage chamber, from which the ram has first been removed. The ram is then replaced in the chamber and screwed down against the tube, whereby the packing A will be forced down through the bottom of the tube, and will flow down through the passage 5 into the stuffing box and against the piston or rod 6. As the wrapping or tube is forced down the thin material of which it is composed will be torn and shredded into fragments 8 which will work in with the packing.

It will be evident that the employment of rubber in the packing herein described will make it impervious to water and steam and will also make it resilient so that it can be forced against the piston rod without taking on a "set," no matter how hot it gets, and it will not wear upon the rod, while the oil will serve as a lubricant and the graphite will prevent the rubber from decomposing. And consisting, as it does, of small particles of rubber and fabric well mixed and coated with oil and graphite, it will form a sticky plastic mass which will have a "flow" and can be forced in continuously about the rod.

I claim as my invention:

1. A steam packing consisting of a casing and a plastic mass of laminated fabric and rubber particles coated with oil and graphite packed therein, said casing being made of flexible frangible material which will be crushed and work in with said mass when subjected to pressure in a stuffing box.

2. A steam packing consisting of small laminated fabric and rubber particles mixed with oil and graphite so as to form a plastic mass.

3. A steam packing consisting of small particles of fabric and rubber mixed together with oil and graphite so as to form a plastic mass capable of being forced continuously into the space to be packed.

4. A steam packing consisting of a casing and a plastic mass of resilient steam proof particles coated with graphite and oil packed therein, said casing being made of flexible, frangible material which will be crushed and work in with said mass when subjected to pressure in the stuffing box.

In testimony whereof I affix my signature in presence of two witnesses.

FRED A. DAILEY.

Witnesses:
H. SMITH,
ARTHUR P. LOTHROP.